Patented May 10, 1927.

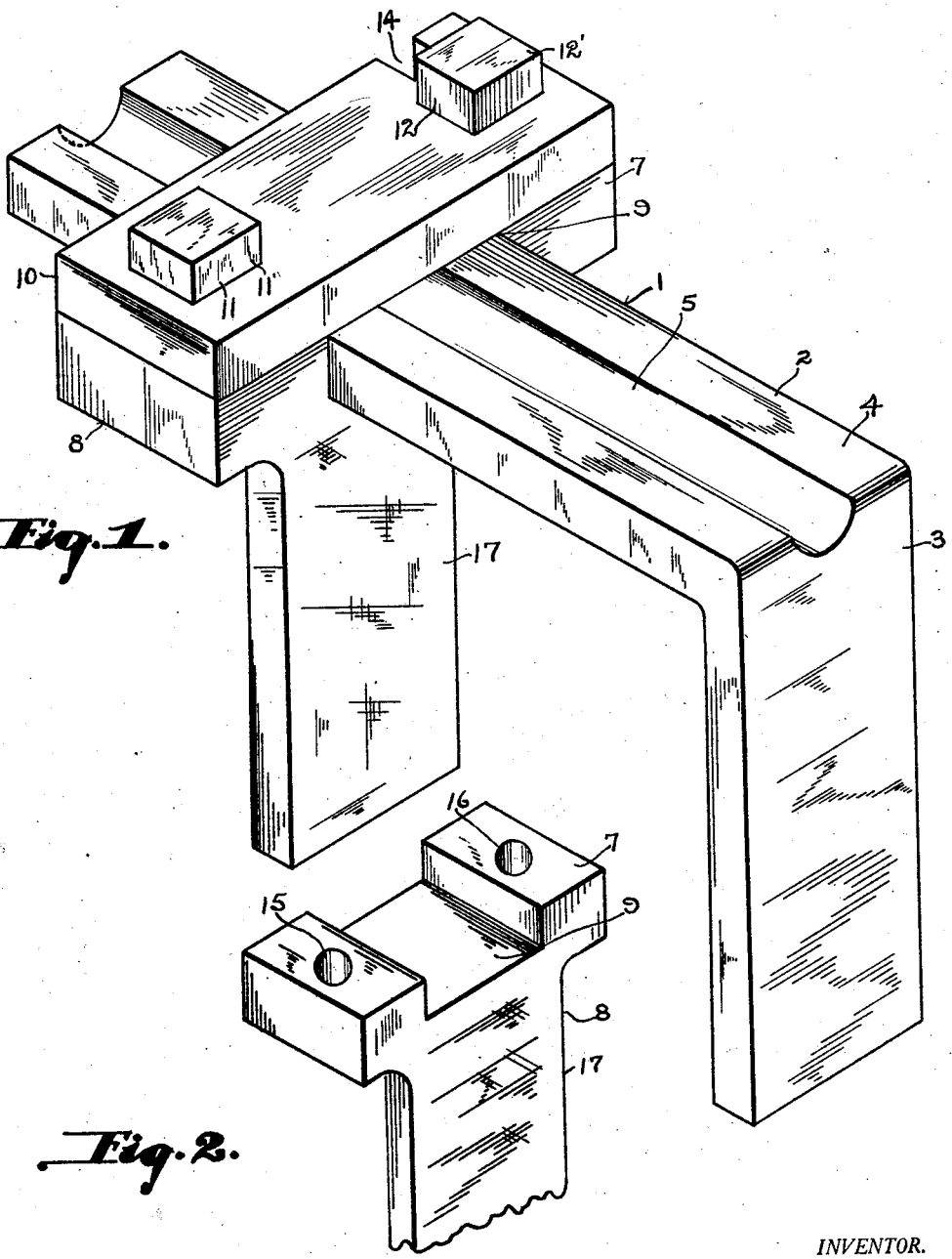

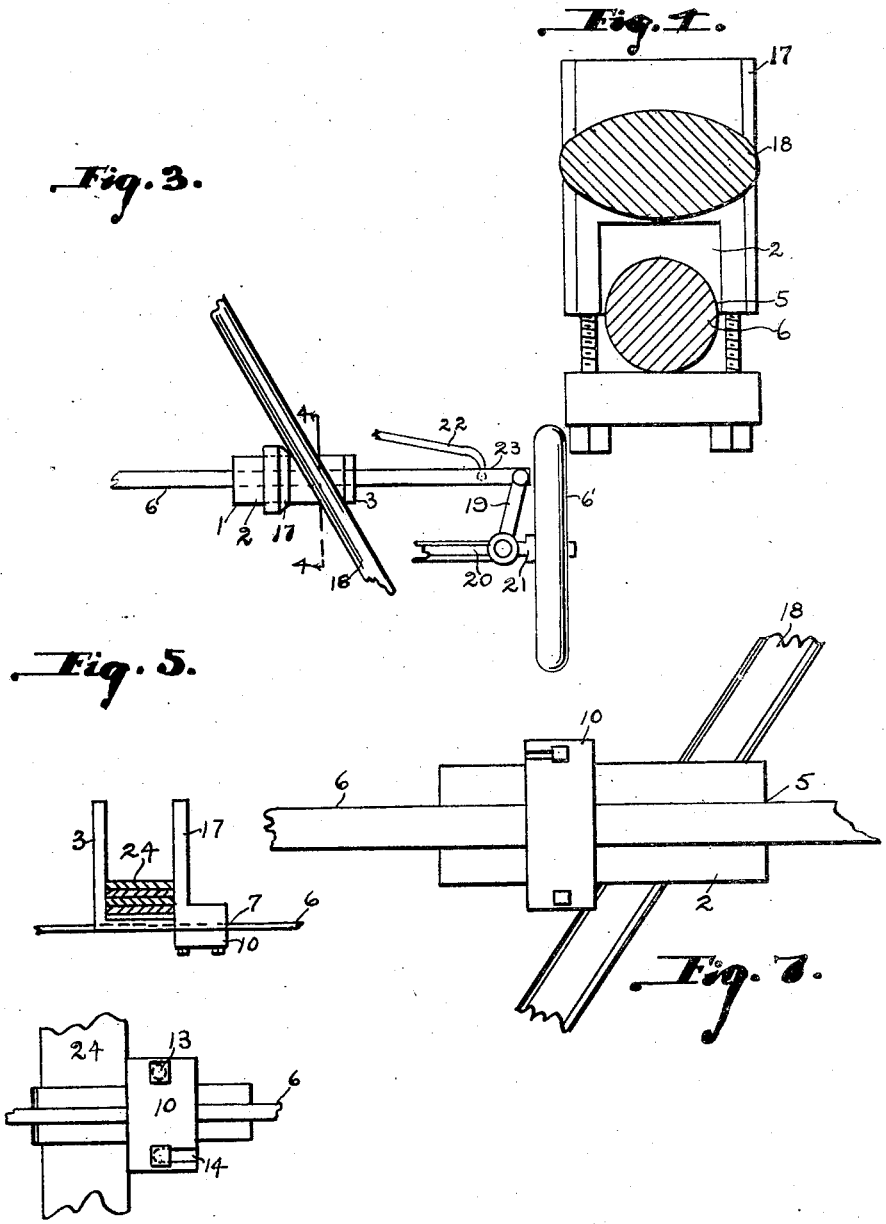

1,628,374

UNITED STATES PATENT OFFICE.

JOSEPH A. TONNE, OF CINCINNATI, OHIO.

AUTOMOBILE APPARATUS.

Application filed August 21, 1925. Serial No. 51,600.

My invention relates to means for locking the tie-rod of a motor vehicle against movement relative to other parts of said vehicle.

The objects of my invention are to provide simple, efficient, durable and economical means for locking the tie-rod of a motor vehicle against movement, whereby an automobile can be "towed" without the need of the services of an individual to sit in said vehicle and steer it; and to provide said means with a structure adapted to be utilized on various kinds and makes of automobiles.

My invention consists in providing an L-shape bar having a groove therein adaptable to receive said tie-rod; in providing a T-shape member having a groove therein adapted to receive a portion of said L-shape bar; and in providing a plate with means for securing said member, tie-rod and bar in fixed relation with one another and with said bar and said member in engagement with a part of said automobile for maintaining said tie-rod in locked position.

My invention, further, consists substantially in the construction, combination, location and relative arrangement of the parts, as herein set forth and claimed.

In the drawings:

Fig. 1 is a perspective of the invention;

Fig. 2 is a perspective of the T-shape member shown partly broken away;

Fig. 3 is a bottom view of an automobile partly broken away and with parts removed showing a modified form of the invention engaging the radius rod;

Fig. 4 is a section taken on a line corresponding to 4—4 in Fig. 3;

Fig. 5 is a side edge elevation of the invention and showing it maintained in fixed engagement with a spring in section;

Fig. 6 is a plan view of the same as Fig. 5 showing the spring partly broken away; and Fig. 7 is a plan view of the invention shown fixed to a tie-rod and radius rod.

In the preferred construction of my invention I provide the L-shape angular bar 1, comprising integrally connected legs 2 and 3 extending at right angles to each other. In the outer side 4 of leg 2 and extending longitudinally of leg 2 is a semicircular groove 5 for receiving the usual tie-rod 6 of an automobile.

In end 7 of the T-shape longitudinal member 8 and extending transversely thereof is groove 9 for receiving leg 2 of bar 1, as shown in Fig. 1. Plate 10, fitted to end 7 of the T-shape longitudinal member 8, is adapted to be secured in contacting engagement with end 7 and leg 2 (or in close engagement with tie-rod 6) as by bolts 11 and 12, respectively, received in hole 13 and slot 14 in the plate and threaded in holes 15 and 16 in end 7 of longitudinal member 8, whereby when tie-rod 6 is received in groove 5 and the heads 11' and 12', respectively, of bolts 11 and 12 are drawn tightly in engagement with plate 10, the plate is maintained in contacting engagement with the tie-rod, as clearly shown in Fig. 4, and legs 3 and 17, respectively, of bar 1 and member 8, are adapted to engage a part of the automobile which is stationary relative to the tie-rod, whereby the front wheels 6' (one being shown in Fig. 3) of the automobile are securely maintained in fixed position with relation to their usual pivotal movement imparted by rotation of the usual steering wheel for steering the automobile.

In Figs. 3 and 4 I show a modified form of my invention in which leg 17 of longitudinal member 8 is the same width as end 7 of member 8. The leg 17 is shown in engagement with one side of radius rod 18 while leg 3 of bar 1 engages the opposite side of the radius rod, whereby tie-rod 6, received in groove 5 in angular bar 1, is retained in fixed position as by plate 10 being maintained in close contacting engagement with the tie-rod by bolts 11 and 12, whereby the front wheels of the automobile upon which my invention is attached are maintained in fixed position relative to the usual pivotal movement imparted by rotation of the usual steering wheel.

As shown in Fig. 3 the ends of tie-rod 6 are pivotally connected with the arms 19 pivotally connected with front axle 20 of an automobile. The arms 19, also, are fixed to axles 21 of the front wheels 6', whereby longitudinal movement of connecting rod 22, having its end 23 pivotally mounted in tie-rod 6, imparts pivotal movements simultaneously to the front wheels 6' for steering the automobile, as by rotation of usual steering wheel (not shown) having operative connection with connecting rod 22.

In Figs. 5 and 6 I show legs 3 and 17, respectively, of bar 1 and member 8 having spring 24 therebetween, whereby since tie-rod 6 is maintained in fixed relation in groove 5 in bar 1, as by plate 10, the tension of bolts 11 and 12, also, maintain member 8 and bar 1 in fixed relation to each other, whereby the tie-rod is locked against longitudinal movement.

The slots 14 may be circular and having an arc formed by a radius from the center of hole 15, or it may be straight of sufficient width.

It is therefore apparent that I have invented a simple and highly desirable device for the purposes intended, and which is adaptable for use on automobiles of various structures.

An advantage of my invention is that when it is desired to tow an automobile, it merely is necessary to properly attach my invention to the automobile which is to be towed, whereby the tie-rod is securely locked thereby preventing sidewise movement of the front wheels. The rear part of the automobile to be towed then may be elevated and supported by the wrecker's or other automobile which, when moved forward, draws with it the attached automobile having its front wheels locked in stationary position by my invention.

It is apparent that the legs 3 and 17, respectively, of bar 1 and member 8 may be positioned in engagement with any suitable stationary part of the automobile whose tie-rod is desired to be locked, whereby when the tie-rod is received in groove 5 of bar 1, and plate 10 is securely maintained in engagement therewith, as by bolts 11 and 12, the front wheels 6' of the automobile are maintained in stationary vertical positions.

In the drawings I have exemplified my invention in use, for instance in Figs. 3, 4 and 7, with legs 3 and 17 in contacting engagement with a radius rod, whereas in Figs. 5 and 6, legs 3 and 17 are shown in contacting engagement with a spring of the automobile. Any other parts of various automobiles whose structure may be especially suitable for engagement with legs 3 and 17 may also be utilized, as the invention can be attached in the most convenient and desirable manner for locking tie-rod 6 against longitudinal movement for the intended purposes.

While I have chosen to illustrate the forms and constructions of my invention by the herein drawings and explanations of the same, it is understood that my invention resides in the combination, arrangement and location of the parts and in the details of construction, as hereinafter claimed. It is further understood that changes in the precise embodiment of my invention, as herein disclosed, can be made within the scope of what is claimed without departing from the spirit of the invention, as other expedients will readily suggest themselves to the art.

What I claim as new and desire to secure by Letters Patent is:

1. In a steering control, an L-shaped member having a groove in the outer side thereof, a T-shaped member having a groove therein adapted to receive the grooved leg of said L-shaped member, a plate adapted to extend over the groove in said T-shaped member and means for maintaining said plate in fixed position relative to said T-shaped member, substantially as and for the purposes specified.

2. In a steering control, an angular bar having a groove therein to receive the tie-rod of an automobile, a longitudinal member having a groove therein adapted to slidably receive said angular bar and means for maintaining said angular bar in fixed position relative to said longitudinal member and said tie-rod, whereby the engagement of said longitudinal member and said bar with a stationary part of said automobile is adapted to maintain said tie-rod in inoperative position.

3. In a steering control, a bar having a groove therein to receive the tie-rod of an automobile, a longitudinal member having a groove therein adapted to slidably receive said bar and means for maintaining said bar in fixed position relative to said longitudinal member and said tie-rod, whereby the engagement of said longitudinal member and said bar with a stationary part of said automobile is adapted to maintain said tie-rod in inoperative position.

4. In a steering control, a bar to engage the tie-rod of an automobile, a longitudinal member having a groove therein adapted to slidably receive said bar and means for retaining said bar in fixed position relative to said longitudinal member and said tie-rod, whereby the engagement of said longitudinal member and said bar with a stationary part of said automobile is adapted to maintain said tie-rod in inoperative position.

5. The combination with a tie-rod of an automobile, of a steering control consisting of a bar having a groove therein to receive said tie-rod, a longitudinal member having a groove therein to slidably receive said bar, a plate extending over said bar, and means to detachably secure said plate to said longitudinal member and in frictional engagement with said tie-rod whereby, when said steering control engages a stationary part of said automobile, said tie-rod is adapted to be maintained in inoperative position.

6. In a steering control, an angular bar having a groove therein adapted to receive the tie-rod of an automobile, a cooperating member having a grooved end adapted to slidably receive the grooved portion of said angular bar and releasable means for maintaining said tie-rod in said angular bar groove and for maintaining said angular bar in fixed position relative to said cooperating member, whereby when said angular bar and said cooperating member are manually positioned in engagement with a different part of said automobile from said tie-rod, said tie-rod is adapted to be maintained in fixed position whereby the front wheels of said automobile are fixed, substantially as described.

7. In a steering control, an angular bar having a groove therein adapted to receive the tie-rod of an automobile, a cooperating member adapted to slidably receive the grooved portion of said angular bar and means for combinedly maintaining said tie-rod in said groove and for maintaining said angular bar in fixed position relative to said cooperating member, whereby when said angular bar and said cooperating member are positioned in engagement with a part of said automobile, said tie-rod is maintained in fixed position, substantially as described.

8. In a steering control, an angular bar adapted to engage the tie-rod of an automobile, a cooperating member adapted to slidably engage said angular bar, and a plate for securing said tie-rod, angular bar and cooperating member in fixed position relative to one another, whereby said angular bar and said cooperating member are adapted to engage a part of said automobile for maintaining said tie-rod in inoperative position, substantially as and for the purposes specified.

9. In a steering control, an angular bar having a groove therein adapted to receive the tie-rod of an automobile, a cooperating member slidable on said bar and a plate for securing said angular bar and cooperating member in fixed relation to one another and in engagement with another part of said automobile, whereby said tie-rod is maintained in inoperative position, substantially as and for the purposes specified.

10. The combination with a tie-rod of an automobile, of a steering control consisting of a bar to engage said tie-rod, a longitudinal member in engagement with said bar and slidable thereon, means to engage said tie-rod and means to retain said tie-rod, bar and member in fixed relation to one another, whereby said tie-rod is adapted to be maintained in inoperative position by the engagement of said steering control with a stationary part of said automobile.

JOSEPH A. TONNE.